United States Patent [19]

Calkins et al.

[11] Patent Number: 4,923,150

[45] Date of Patent: May 8, 1990

[54] PARACHUTE SPRING RING RELEASE

[75] Inventors: Robert B. Calkins, Huntington Beach; Frederick F. Rinke, Lakewood, both of Calif.

[73] Assignee: McDonnell Douglas Corporation, Long Beach, Calif.

[21] Appl. No.: 320,188

[22] Filed: Mar. 7, 1989

[51] Int. Cl.⁵ .............................................. B64D 17/38
[52] U.S. Cl. ..................... 244/151 B; 24/602; 24/574; 244/148
[58] Field of Search ............... 244/150, 151 R, 151 A, 244/151 B, 147–149; 24/602, 574

[56] References Cited

U.S. PATENT DOCUMENTS

| 2,100,693 | 11/1937 | Irvin | 244/149 |
|---|---|---|---|
| 2,845,241 | 7/1958 | Samms | 244/148 |
| 3,029,050 | 4/1962 | Boensch | 24/574 |
| 3,120,365 | 2/1964 | Gutacker | 244/149 |
| 3,142,102 | 7/1964 | Saunders | 24/602 |
| 3,237,265 | 3/1966 | Florian | 24/602 |
| 4,337,913 | 7/1982 | Booth | 244/151 B |
| 4,428,102 | 1/1984 | Brownell | 244/151 A |
| 4,746,084 | 5/1988 | Strong | 244/151 R |

Primary Examiner—Galen Barefoot
Attorney, Agent, or Firm—Gregory A. Cone; George W. Finch; John P. Scholl

[57] ABSTRACT

A parachute ring release mechanism with a spring incorporated to insure disengagement of the parachute risers. The ring release is structured such that the parachute risers may be released by either one of two rip cords.

20 Claims, 7 Drawing Sheets

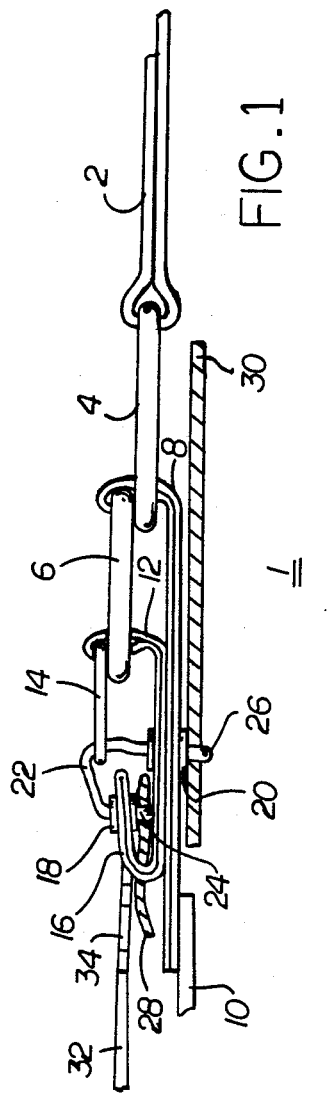
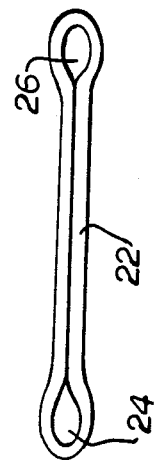
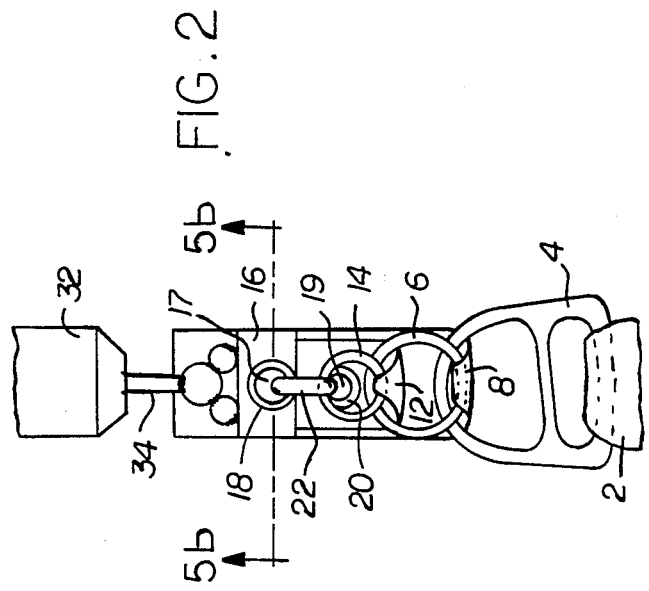

FIG.3
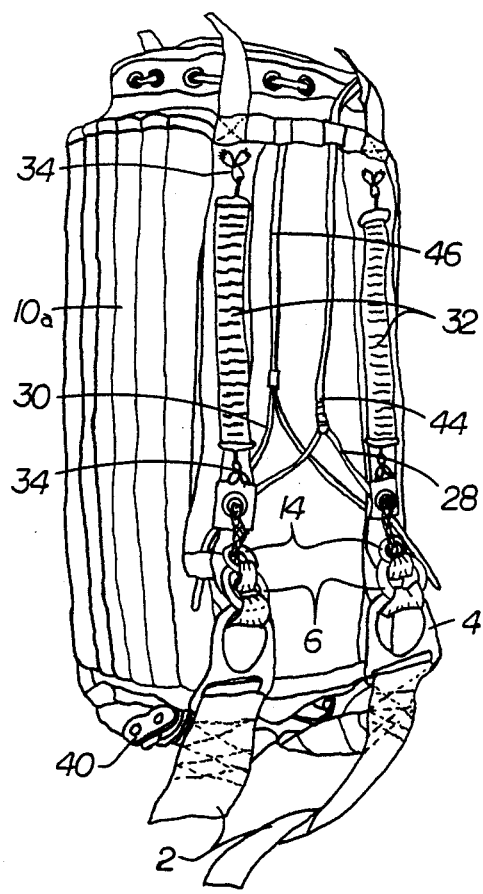
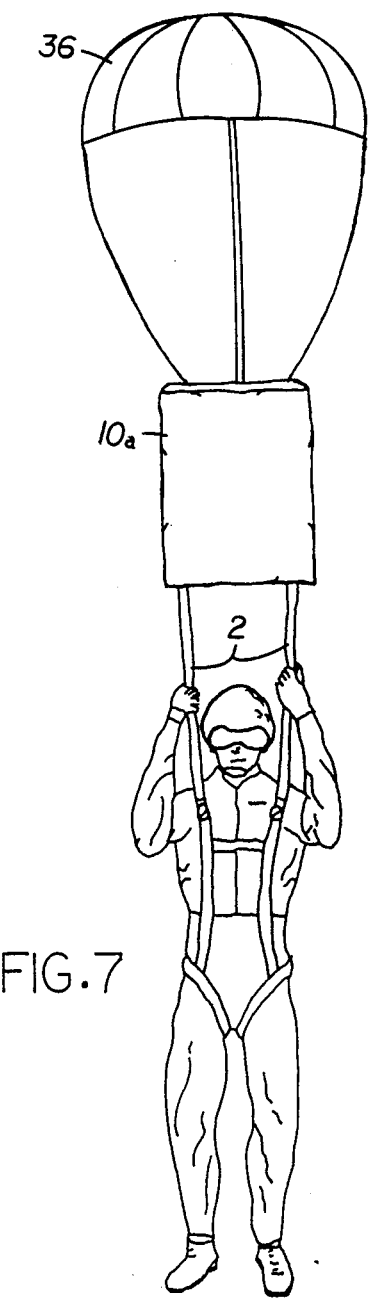
FIG.7

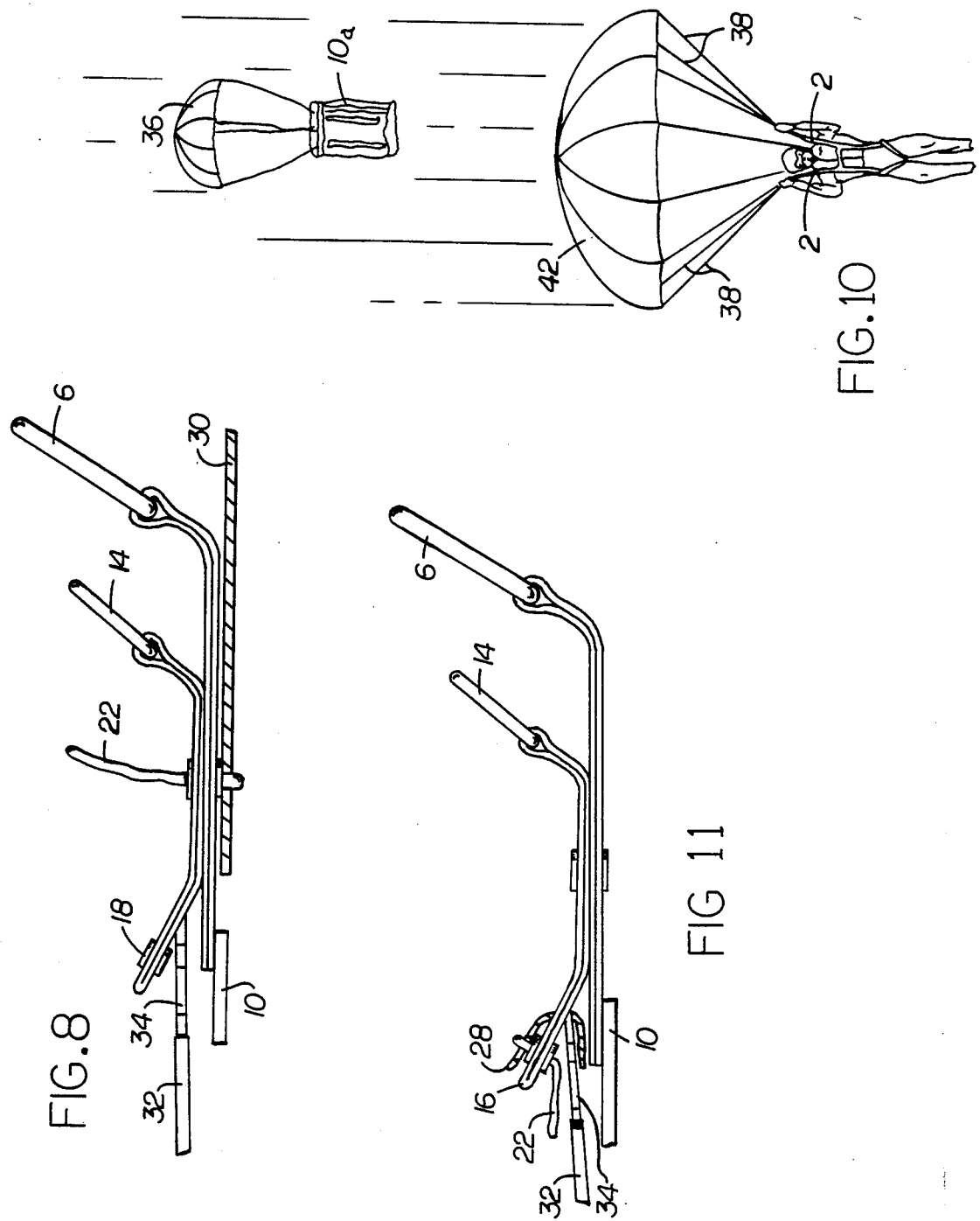

PARACHUTE SPRING RING RELEASE

This invention relates to parachutes and the means for releasing the chute from a harness or packing bag.

No other part of a parachute assembly is more important than the mechanism that releases the chute. The performance of the release mechanism can mean the difference between life and death for the jumper. To ensure reliability it is desirable to have the simplest mechanism possible that is easy to release without being susceptible to premature detachment.

One type of release mechanism is shown in U.S. Pat. No. 4,337,913 where the chute riser is connected to a harness by a series of rings and a thong. The thong is attached to the riser, passing through the last ring, two grommets and is releasably secured by a rip cord. This apparatus is used when the parachute is released and it is desirable to disengage the jumper from the chute. The jumper pulls the rip cord at which point the force from the chute pulls the thong through the grommets and last ring allowing the riser to detach from the harness.

Because the riser is essentially perpendicular to the thong, the force being exerted on the thong to Pull it out of the grommets is small compared to the riser pulling force. For instance, when a 20 pound force is being applied by the riser 0.1 pounds of force is being exerted on the thong. If there is any interference between the grommets and thong, the 0.1 pounds of force will not pull the thong through the grommets and the chute will not release.

U.S. Pat. No. 4,746,084 is similar to the release mechanism in 913 except it allows the chute riser to be released by either one of two rip cords.

SUMMARY OF INVENTION

This invention is an apparatus that detachably connects the risers of a parachute to a packing bag or harness comprising, a ring connected to at least one of the chute risers, a series of loops attached to the packing bag, each loop inserted through and connecting each preceding loop, where the first loop is inserted through and connected to the riser ring. The packing bag has a flap with a grommet inserted and a spring in tension attached to the flap. A flexible thong is passed through the last loop in the series of loops and then through the grommet. The ends of the flexible thong are releasably secured by rip cords. When a rip cord is pulled, the tension spring pulls the flap away from the series of loops ensuring that the flexible thong separates from the grommet allowing the risers and chute to release.

Because the tension spring is pulling the flexible thong through the grommet, this invention ensures the release of the chute no matter what force the riser is exerting on the flexible thong.

The spring ring release is designed such that either one of two rip cords can be pulled and the spring will pull the thong through the grommet, releasing the chute. This creates the possibility of having a rip cord that is pulled automatically and a backup rip cord which can be pulled by the jumper.

In addition, the spring ring release mechanism can be utilized with only one rip cord.

BRIEF DESCRIPTION OF THE DRAWINGS

FIG. 1 is a spring ring release mechanism.

FIG. 2 is a top view of the spring ring release mechanism.

FIG. 3 is a pair of spring ring release mechanism attached to a parachute packing bag.

FIG. 6 is a flexible thong.

FIG. 7 is a jumper and a parachute packing bag with an opened pilot chute.

FIG. 8 is a spring ring release mechanism after a first rip cord has been pulled.

FIG. 10 is a jumper with an opened main chute fully disengaged from a packing bag and pilot chute.

FIG. 11 is a spring ring release mechanism after a second rip cord has been pulled.

DETAILED DESCRIPTION OF THE INVENTION

Figure 4:
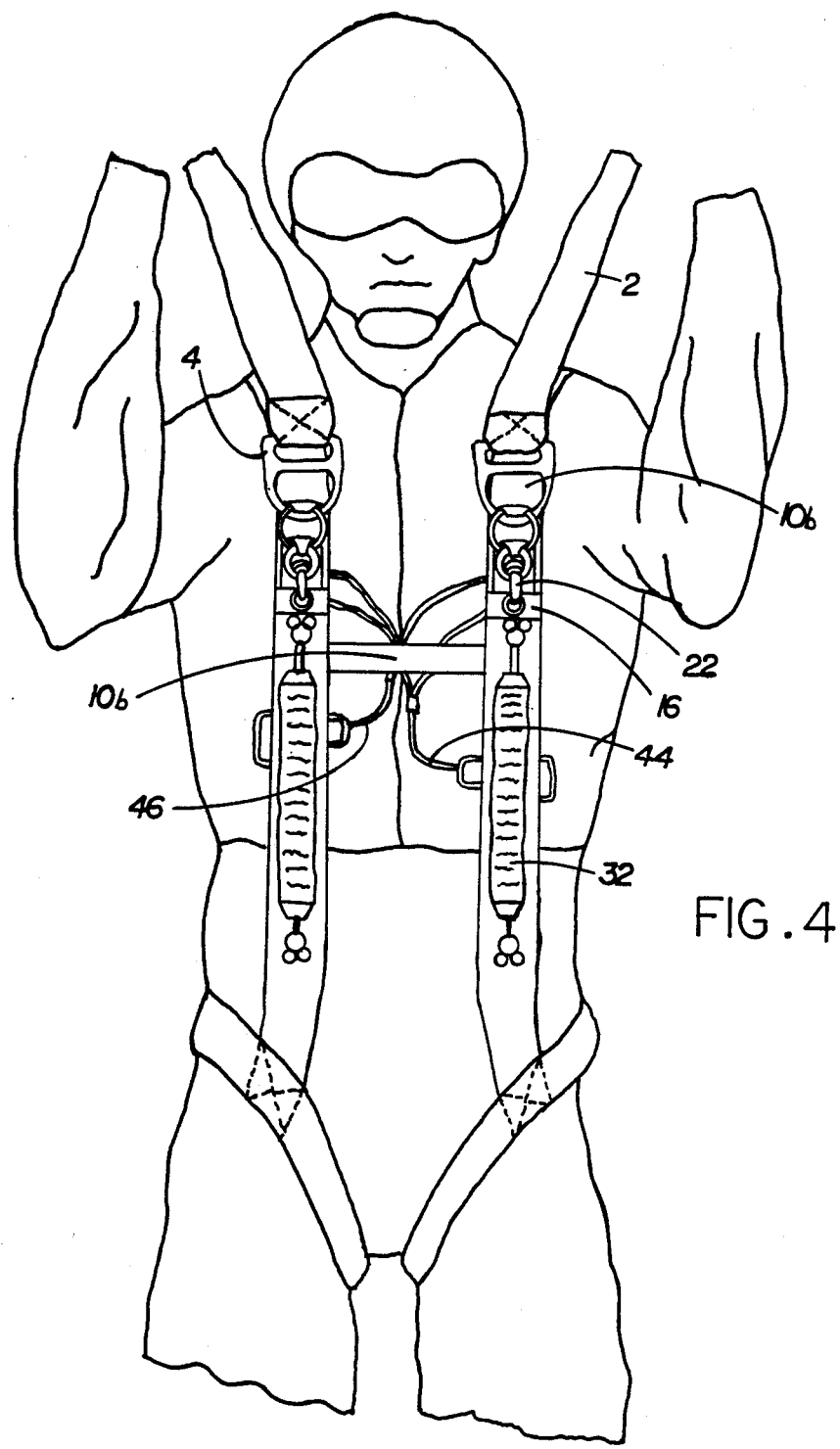
FIG. 4 is a pair of spring ring release mechanisms attached to a parachute harness.

FIG. 1 is an embodiment of the spring ring release 1. Number 2 is a parachute riser 2 which is sewn onto a first ring 4, see FIG. 2. A first loop 6 is sewn into a first web 8 which is sewn onto a parachute securing member 10, which may be a packing bag 10a as shown in FIG. 3 or a parachute harness 10b, see FIG. 4. A second web 12 is sewn onto the first web 8 and a second loop 14 is sewn into the second web 12. The first ring 4 is connected to the first loop 6 by passing the first loop 6 through the first ring 4. The outside diameter of the first loop 6 is smaller than the inside diameter of the first ring 4 so that the first loop 6 may pass through the first ring 4. The first loop 6 is connected to the second loop 14 by passing the second loop 14 through the first loop 6. The outside diameter of the second loop 14 is smaller than the inside diameter of the first loop 6 so that the second loop 14 may pass through the first loop 6. One end of the second packing bag web 12 is left unsewn so that it may bend over to form a flap 16. A first aperture 17 is cut into the flap 16, see FIG. 2. A first grommet 18 is placed within the first aperture 17, by inserting a grommet tack 18a through the first aperture 17, and placing a grommet ring 18b on the flap 16 see FIG. 5a, then swaging the shank of the grommet tack 18a onto the grommet ring 18b, see FIG. 5b. A second aperture 19 is cut into the webs 8 and 12 and a second grommet 20 is placed in the second aperture 19.

A flexible thong 22 is inserted through the first grommet 18, passed through the second loop 14 and inserted through the second grommet 20. The flexible thong 22 is made out of a flexible material such as nylon and is sewn in the middle to create a third aperture 24 and a fourth aperture 26, see FIG. 6. A first rip cord 28 passes through the third aperture 24 of the flexible thong 22, preventing the flexible thong 22 from passing through the first grommet 18. A second rip cord 30 passes through the fourth aperture 26 of the flexible thong 22 preventing the flexible thong 22 from passing through the second grommet 20.

A tension spring 32 is attached by first buckles 34 to the parachute securing member 10 and the flap 16. The tension spring 32 exerts a force on the flap 16 in a direction opposite to the parachute riser 2. The tension spring 32 could be a metal coil, a bungee strip or any similar elastic structure.

When the parachute securing member 10 is a packing bag 10a as in FIG. 3, the main chute, not shown in FIG. 3, is enclosed within the packing bag 10a. When the jumper becomes airborne, a pilot chute 36 is released, at which point the weight of the jumper and drag on the chute 36 exerts a force on the parachute riser 2, see FIG. 7. The jumper then pulls the first rip cord 28, pulling the first rip cord 28 through the third aperture 24. The tension spring 32 pulls the flap 16 away from the second loop 14, pulling the flexible thong 22 through the first grommet 18 while the parachute riser 2 pulls the flexible thong 22 through the second loop 14. The force exerted by the parachute riser 2 pulls the second loop 14 through the first loop 6 and the first loop 6 through the first ring 4, releasing the parachute riser 2 from the packing bag 10a, see FIG. 8.

Figure 9:
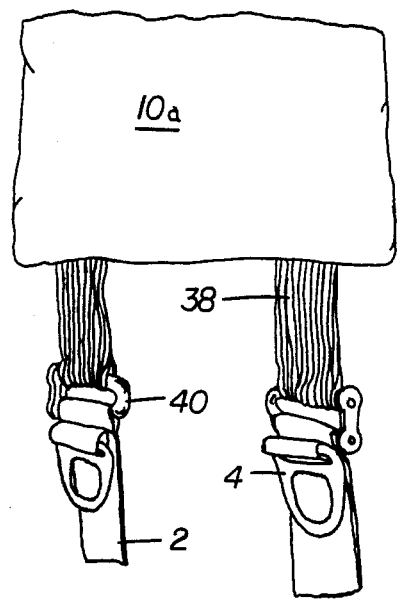
FIG. 9 is the risers pulling the parachute shrouds from a packing bag.

The parachute suspension lines 38 are attached to the riser 2 by sewing the riser 2 and suspension lines 38 to a second buckle 40, see FIG. 9. With the riser 2 released from the packing bag 10a the weight of the jumper pulls the main parachute 42 out of the packing bag 10a allowing the main parachute 42 to open, see FIG. 10.

In the alternative the second rip cord 30 may be automatically pulled, pulling the second rip cord 30 through the fourth aperture 26. The tension spring 32 pulls the flap 16 away from the second loop 14 pulling the flexible thong 22 through the second grommet 20 while the parachute riser 2 pulls the flexible thong 22 through the second loop 14. The force exerted by the parachute riser 2 pulls the second loop 14 through the first loop 6 and the first loop 6 through the first ring 4, releasing the parachute riser 2 from the packing bag 10a allowing the main parachute 42 to open, see FIG. 11.

Figure 5A:
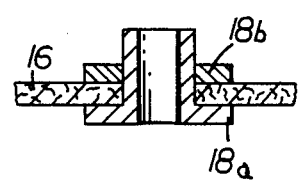
FIG. 5a is both halves of a grommet assembly placed on a spring ring release mechanism flap.
Figure 5B:
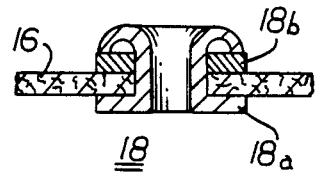
FIG. 5b is an assembled grommet swaged onto a spring ring release mechanism flap.

To facilitate the release of the main chute 42, it is desirable to have a spring ring release mechanism 1 on each side of the parachute securing member 10, see FIG. 3 and 4. To allow the jumper to release the parachute securing member 10 with one motion, the first rip cord 28 of each spring ring release mechanism 1 is combined into one combined first rip cord 44. The second rip cord 30 is also combined into one combined second rip cord 46.

The spring release mechanism could be used to separate a jumper from the main chute 42 by attaching the tension spring 32 and first web 8 to the harness 10b of the main parachute 42, see FIG. 4. In this configuration the jumper is airborne and the main chute 42 is fully open. If a malfunction of the main chute 42 occurs, the jumper can pull a ripcord 44 or 46 and quickly release the main chute 42.

Figure 12:
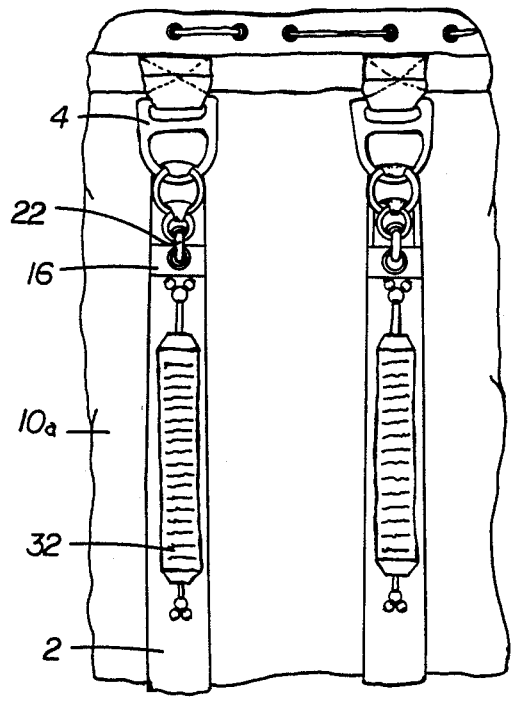
FIG. 12 is a pair of spring ring release mechanisms incorporated into a packing bag, wherein the spring, flap and loops are attached to a riser.
Figure 13:
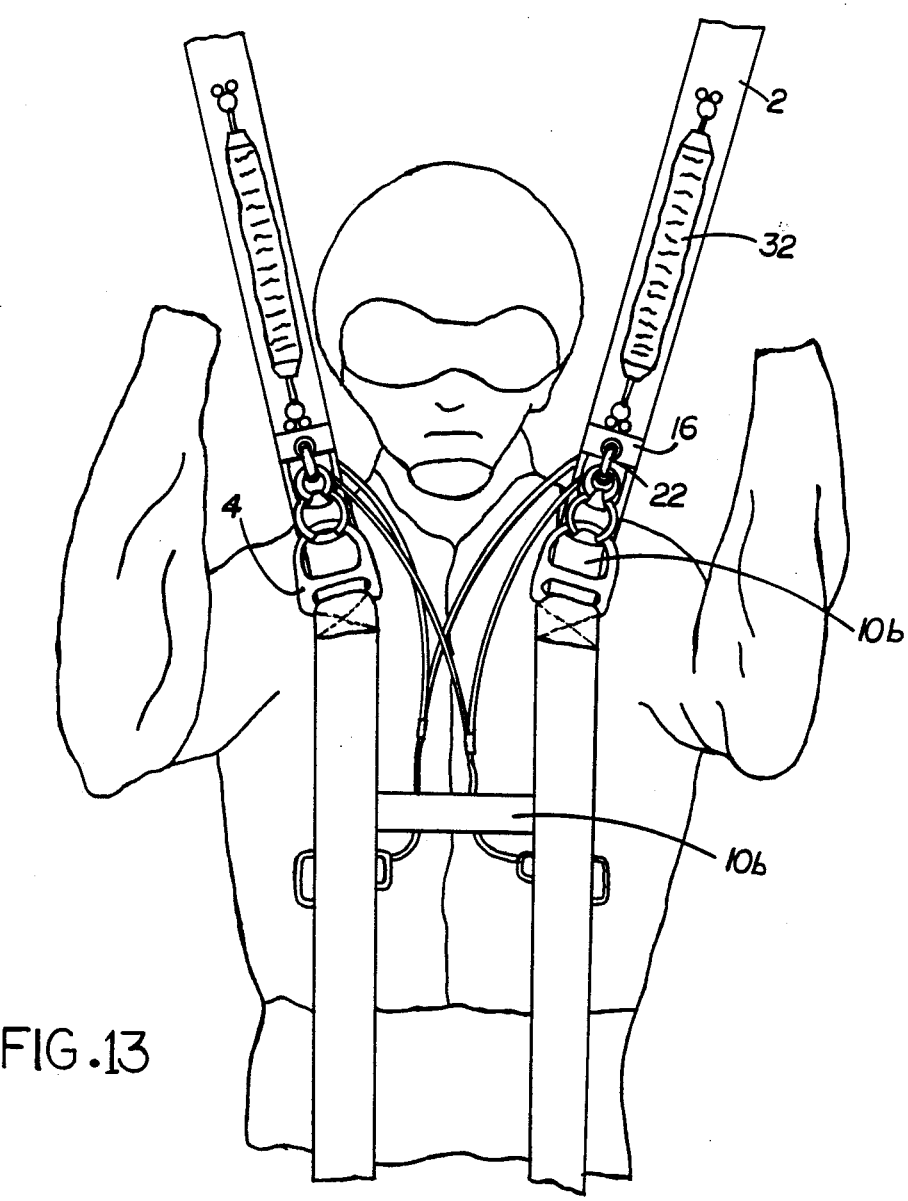
FIG. 13 is a pair of spring ring release mechanisms incorporated into a harness wherein the spring, flap and loops are attached to a riser.

The spring ring release mechanism 1 can be rotated 180 degrees by sewing the first ring 4 to the parachute securing member 10 and attaching the first buckle 34 and the first web 8 to the riser 2, see FIG. 12 and 13.

Figure 14:
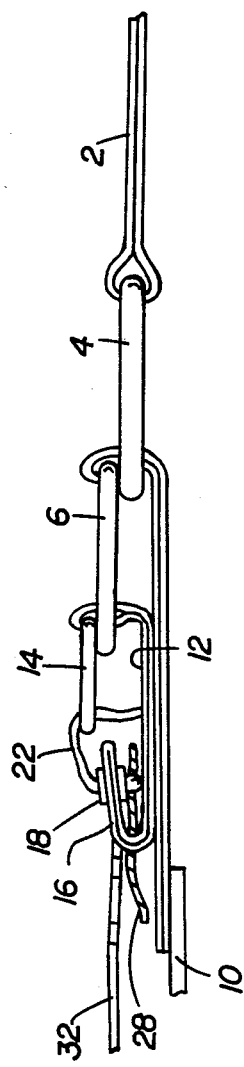
FIG. 14 is a spring ring release mechanism with only a first rip cord.
Figure 15:
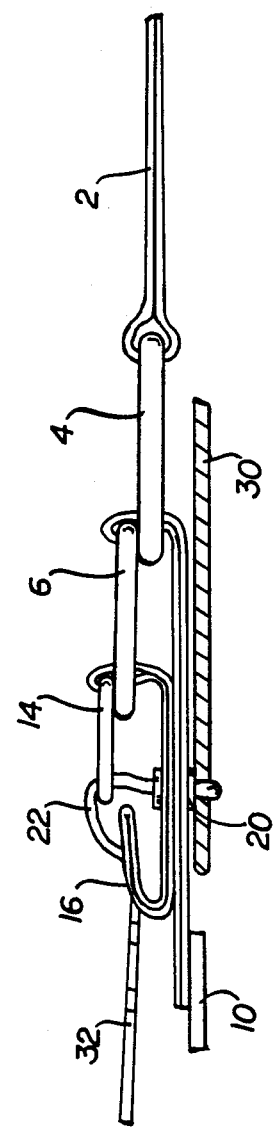
FIG. 15 is a spring ring release mechanism with only a second rip cord.

The spring ring release mechanism 1 can be utilized with only the first rip cord 28, by removing the second grommet 20 and sewing the flexible thong 22 onto the second web 12, see FIG. 14. Using only the second rip cord 30 can be accomplished by removing the first grommet 18 and sewing the flexible thong 22 onto the flap 16, see FIG. 15.

What is claimed is:

1. A spring ring release mechanism that detachably connects the risers of a parachute to a parachute securing member comprising:
   (a) a first ring attached to said riser;
   (b) a series of loops each directly attached by means to said parachute securing member, having a first loop passing through the inner circumference of said first ring connecting said first loop to said first ring, each additional loop passing through the inner circumference of each preceding loop, connecting each additional loop with each preceding loop;
   (c) a flap attached to said parachute securing member, said flap having a first aperture near one end;
   (d) a flexible thong attached to said parachute securing member, said flexible thong passes through the inner circumference of the last loop in said series of loops and through said first aperture;
   (e) a first rip cord detachably connected to said flexible thong, whereby said flexible thong is prevented from passing through said first aperture;
   (f) a tension spring attached to said parachute securing member and said flap, whereby said tension spring pulls said flap away from said series of loops after said first rip cord is detached from said flexible thong.

2. The mechanism recited in claim 1 wherein said loop attaching means is a series of webs attached to each other, said webs having a second aperture through which said flexible thong is inserted.

3. The mechanism as recited in claim 2 further comprising a second rip cord detachably connected to said flexible thong whereby said flexible thong is prevented from passing through said second aperture, said tension spring pulls said flap away from said series of loops when said second rip cord is detached from said flexible thong.

4. The mechanism as recited in claim 3 further comprising a first grommet fastened into said first aperture.

5. The mechanism as recited in claim 4 further comprising a second grommet fastened into said second aperture.

6. The mechanism as recited in claim 5 wherein two such spring ring release mechanisms are used on each side of said parachute securing member.

7. The mechanism as recited in claim 6 wherein the first rip cords of each spring ring release mechanism are combined into one combined first rip cord.

8. The mechanism as recited in claim 7 wherein the second rip cords of each spring ring release mechanism are combined into one combined second rip cord.

9. A spring ring release mechanism that detachably connects the risers of a parachute to a parachute securing member comprising:
   (a) a first ring attached to said parachute securing member;
   (b) a series of loops each directly attached by means to said riser, having a first loop passing through the inner circumference of said first ring connecting said first loop to said first ring, each additional loop passing through the inner circumference of each preceding loop, connecting each additional loop with each preceding loop;
   (c) a flap attached to said riser, said flap having a first aperture near one end;

(d) a flexible thong attached to said riser, said flexible thong passes through the inner circumference of the last loop in said series of loops and through said first aperture;

(e) a first rip cord detachably connected to said flexible thong, whereby said flexible thong is prevented from passing through said first aperture;

(f) a tension spring attached to said riser and said flap, whereby said tension spring pulls said flap away from said series of loops after said first rip cord is detached from said flexible thong.

10. The mechanism recited in claim 9 wherein the loop attaching means is a series of webs attached to each other, said webs having an second aperture through which the flexible thong is inserted.

11. The mechanism as recited in claim 10 further comprising a second rip cord detachably connected to said flexible thong whereby said flexible thong is prevented from passing through said second aperture, said tension spring pulls said flap away from said series of loops when said second rip cord is detached from said flexible thong.

12. The mechanism as recited in claim 11 further comprising a first grommet fastened into said first aperture.

13. The mechanism as recited in claim 12 further comprising a second grommet fastened into said second aperture.

14. The mechanism as recited in claim 13 wherein two such spring ring release mechanisms are used on each side of said parachute securing member.

15. The mechanism as recited in claim 14 wherein the first rip cords of each spring ring release mechanism are combined into one combined first rip cord.

16. The mechanism as recited in claim 15 wherein the second rip cords of each spring ring release mechanism are combined into one combined second rip cord.

17. A spring ring release mechanism that detachably connects the risers of a parachute to a parachute securing member comprising:

(a) a first ring attached to said parachute riser;

(b) a series of loops directly attached to said parachute securing member by a series of attached webs, said webs having a second aperture, said series of loops having a first loop passing through the inner circumference of said first ring connecting said first loop to said first ring, each additional loop passing through the inner circumference of each preceding loop, connecting each additional loop with each preceding loop;

(c) a flap attached to said parachute securing member;

(d) a flexible thong attached to said flap, said flexible thong passes through the inner circumference of the last loop in said series of loops and through said second aperture;

(e) a second rip cord detachably connected to said flexible thong, whereby said flexible thong is prevented from passing through said second aperture;

(f) a tension spring attached to said parachute securing member and said flap, whereby said tension spring pulls said flap away from said series of loops after said second rip cord is detached from said flexible thong.

18. The mechanism as recited in claim 17 further comprising a second grommet fastened into said second aperture.

19. A spring ring release mechanism that detachably connects the risers of a parachute to a parachute securing member comprising:

(a) a first ring attached to said parachute securing member;

(b) a series of loops directly attached to said riser by a series of attached webs, said webs having a second aperture, said series of loops having a first loop passing through the inner circumference of said first ring connecting said first loop to said first ring, each additional loop passing through the inner circumference of each preceding loop, connecting each additional loop with each preceding loop;

(c) a flap attached to said riser;

(d) a flexible thong attached to said flap, said flexible thong passes through the inner circumference of the last loop in said series of loops and through said second aperture;

(e) a second rip cord detachably connected to said flexible thong, whereby said flexible thong is prevented from passing through said second aperture;

(f) a tension spring attached to said riser and said flap, whereby said tension spring pulls said flap away from said series of loops after said second rip cord is detached from said flexible thong.

20. The mechanism as recited in claim 19 further comprising a second grommet fastened into said second aperture.

* * * * *